Jan. 9, 1968  J. STALEY  3,362,798
METHOD OF REACTING MATERIALS AT HIGH TEMPERATURE
Original Filed April 10, 1963
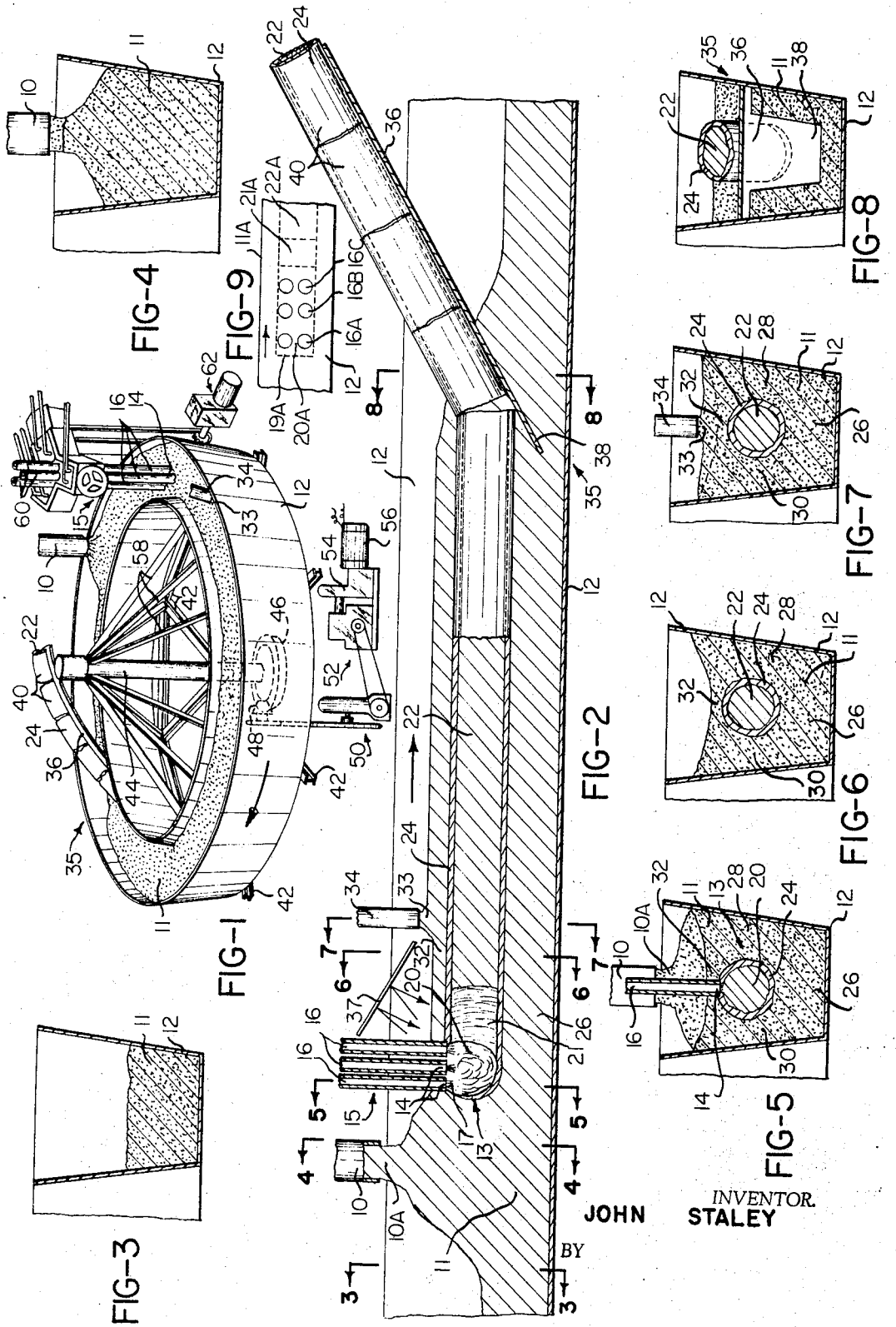
INVENTOR.
JOHN STALEY
BY

United States Patent Office 3,362,798
Patented Jan. 9, 1968

3,362,798
METHOD OF REACTING MATERIALS AT
HIGH TEMPERATURE
John Staley, 2910 Westchester Road,
Richmond, Va. 23225
Original application Apr. 10, 1963, Ser. No. 272,012.
Divided and this application Sept. 9, 1966, Ser. No.
601,242
3 Claims. (Cl. 23—301)

This application is a divisional patent application under Rule 147 of its co-pending parent patent application, Ser. No. 272,012, filed Apr. 10, 1963.

This invention is directed to a method of physically and/or chemically reacting materials at high temperatures on a continuous basis. The materials may have the characteristics of magnesia or of magnesia containing materials. For example, they may have the high temperature fusion characteristics of commercial magnesia, mullite, forsterite, chrome-magnesia, zirconia, zirconium boride, or similar materials. They may be used in discrete form such as comminuted artificially in any desired manner. They may be in fragments of from 1/8" to 3/4", as a suitable maximum dimension, with or without dust-like particles remaining in the raw material, as desired.

Frequently, it is desirable to produce chemical and/or physical changes in high melting point or refractory materials and, accordingly, enhance their utility by changing their crystal structure, change their chemical composition, reduce their reactivity to moisture and the elements, increase their density and reduce voids, agglomerate or remove certain impurities contained therein from the crystal lattice of the major component. In some cases, it is desirable to react one or more of the components with an additive so that a chemical or physical combination is achieved so as to improve the electrical properties or mechanical behavior in subsequent operations.

Heretofore, the temperatures necessary to bring about one or more of the desired changes mentioned above were practicably obtained only in a batch operation because the handling, beneficiation, casting, and so forth were problems too formidable for continuous operation on a practical commercial scale. Such batch operations are undesirable from a standpoint of labor and equipment efficiency as well as the utilization of electric power. In addition, when batch fusion operations are conducted, non-uniform segregation often takes place within the fused mass resulting in variability of the product, necessary recycling of substandard material, and additional expense of sorting and selecting the most desired materials.

The present invention permits a practical and continuous operation overcoming those problems associated with a batch process. Other benefits provided by the present invention are the reduced handling or materials, greater thermal efficiency, ease of recycling the unfused portion, and the reduced holdup in the production plant resulting in reduced inventories and costs. Frequent setup and starting times are eliminated with reduced labor costs and utilization of the electrical equipment can be at full capacity in that it is not necessary to start and stop fusions because of limitations of furnace size or fusion container volume.

This invention is useful in forming a melted and solidified product which can be used as is or further treated to produce chemicals, refractories, and an electrically insulating granulated product, such as magnesium oxide suitable, for example, for use in metal tube sheathed electrical heaters. Such granulated magnesium oxide containing product may be used to hold one or more electric resistance conductors firmly within the metal tube so the electric conductor or conductors cannot be accidentally shorted either against the metal tube or against adjacent portions or spirals of the electric conductor or conductors within the metal tube.

The method of making such a magnesium oxide containing granulated product for metal tube sheathed heaters, as now practiced, requires the melting and solidifying of discrete raw materials of the character above described to form a fused product. Hence this invention is particularly useful in melting and solidifying raw materials for use in making such electrically insulating granulated product for an electric heater, or the like.

Magnesium oxide has a melting temperature of 2800° C., and many of the raw materials herein described have melting temperatures approximating the magnesium oxide melting temperature. These materials, and similar materials having similar characteristics, such as the high temperature of reaction, may be treated by the method of this invention.

For example, a method according to this invention may include the fusing of material in discrete or comminuted form, which material has the high temperature melting characteristics and the electrically insulating characteristics of magnesium oxide. Such a method may include forming a relative large, horizontal, linear, unmelted formation of such material, establishing a reaction zone near the arc zone at the ends of a plurality of electrodes in a central zone of said formation to melt a portion of such unmelted material into a relatively small, confined, melted body or globule of such material at said central zone. A slow, horizontal, linear, relative movement may be caused between such formation and the ends of said electrodes continuously to remove and solidify a portion of melted material from one part of said confined melted body or globule and continuously to introduce a portion of said unmelted material into another part of said melted body or globule. Portions of the solidified portion of melted material may be removed at a removing zone substantially remote from said arc zone, after such portions have cooled substantially.

If desired, such linear unmelted formation may be in the form of a relatively thick and deep horizontal formation which continuously and orbitally circulates portions of said unmelted material past said reaction zone and said removing zone, and in which additional make-up unmelted material is introduced into said formation.

Accordingly, it is among the objects of this invention to provide a method of chemically and/or physically reacting and solidifying raw material at high temperature to form a fused product which may be used, for example, in refractories and other products and in producing granulated insulating material for metal tube sheathed electric heaters, and the like.

Other objects are apparent from this description, the appended claimed subject matter, and/or the accompanying drawings, in which:

FIGURE 1 is a view in perspective of an apparatus for practicing this method.

FIGURE 2 is a diagrammatic straight line development of the various steps which are performed in the apparatus of FIGURE 1, as viewed outwardly from the center of FIGURE 1.

FIGURES 3–8, inclusive, are diagrammatic cross sections, respectively, along the lines 3—3 to 8—8, inclusive, of FIGURE 2.

FIGURE 9 is a diagrammatic plan view of another embodiment of electrode arrangement.

According to this invention the raw material, such as magnesia containing material, or material having the high reaction temperature properties of such magnesia containing material, in discrete or comminuted form, may be fed from chute 10 and be distributed into a relatively large linear, annular or orbital formation 11 of such material. This formation is substantially horizontal. The material is melted by heating means capable of producing electric arc temperatures, such as by an electrode construction 15 with its arc ends 14 in a central zone 13 to form a relatively small, confined, melted body, pool or globule 20 within such central zone 13 of the formation 11 by means of arcs produced in said zone 13. A portion 21 of melted material of such confined melted body 20 may be continuously separated from one part of said body 20, while a portion of unmelted material is fed into another part of said body 20, by slow relative motion between said formation 11 and said melting zone 13, or the arc ends of said electrode formation 15, to form a relatively long core 22 which may be cylindraceous. This core 22 may have an outer adhering crust 24 which is formed and adhered to core 22 during the solidification stage of said portion 21. This core 22 and crust 24 may be gradually cooled and then may be removed from the formation 11 at a removing zone 35 by breaking such core and crust into smaller cylindraceous bodies 40 and lifting them by the slanting elevator platform 36 with the pushing aid of the slow relative motion between the formation 11 and the removing zone 35 or elevator platform 36. A replacing quantity 10A of material may be fed by feeder or chute 10 into the formation 11 to compensate for the removal from formation 11 of the fused material and crust in the bodies 40.

It is to be noted that the method has several advantages. The large proportion of unmelted material 26, 28, 30, and 32, surrounding the melted body or pool 20, the solidifying portion 21, and the cooling core 22, insulates the annular trough 12 or other supporting structure against the intense heat produced by the reacting of the raw material and prevents damage to the trough 12. The submerged ends 14 of the electrodes 16 produce their arcs 17 in a submerged condition more efficiently to produce the intense melting heat required. The arcs are of a character that they do not melt the raw material adjacent the trough 12, but confine the melted pool to the central zone 13. The completely surrounding unmelted material 26, 28, 30 and 32, and additional material 33, which may be added by chute 34, absorb the intense high temperature heat energy from the hot pool 20, the hot core 22 and the hot crust 24 and distribute this heat energy in the form of a lower temperature heat energy into the unmelted raw material which is re-circulated in trough 12 or otherwise during the process. This insures a materially reduced radiation loss, without labor of removal and reloading of such raw material.

If desired, part or all of the crusted material 24 may be removed from the solidified fused material 22, and all or part of such crusted material may be returned to the trough 12. The crusted material may be returned by mixing it with the material being fed at 10 and/or 34 or it can be returned into the formation 11 at any other place.

This invention will now be described in more detail without intending hereby to limit the scope of the invention as set forth in the appended claimed subject matter.

Raw material is fed in discrete form through the feeding means, such as the chute or funnel 10 into the slowly and horizontally moving revolving annular trough 12, which moves at a linear speed of less than about 10" per minute. The total depth of the raw material before it reaches the fusion zone, as shown in FIGURE 4, is always greater than about 8". The trough is 24" wide at the bottom, 30" wide at the top, 30" deep and has an outside diameter of 180". These dimensions have been found satisfactory for the apparatus illustrated in the drawings.

However, a smaller unit may be used which has a trough with substantially vertical sides. The unit may have a width of 14", a depth of 11" and an outer diameter of 48". The linear speed of this unit is slow enough to permit sufficient cooling of the melted and solidified material, and has a linear speed of less than 10" per minute.

The raw material may be any material having the characteristics of a suitable magnesium oxide raw material or other material having a high melting temperature, such as elsewhere identified.

The raw material may be made into discrete form by being crushed into particles of from 1/8" to 3/4", with or without the removal of the dust particles formed in the crushing operation. Such dust particles are not objectionably disseminated into the atmosphere by this method because they are not scattered by the slow moving action of the process. Hence a reasonable proportion of dust particles may be allowed to remain in the raw material. Hence an advantage of this method is that any dust which is formed during the crushing operations of the raw material or the crust material may remain with the material being fed into the trough 12. Such dust is not objectionable in connection with this invention because there is no violent stirring which might otherwise disseminate into the atmosphere.

Any crust material which is formed, as elsewhere described, may be removed from the fused core material and may be crushed, if necessary, to particles of a size of 1/8" to 3/8", and then may be returned to the trough 12.

The material which is fed from the feeding means or chute 10 into the trough 12 may be maintained substantially at the height as shown in proportion in FIGURE 4, which height is substantially higher than the fusion or reaction zone as indicated in FIGURE 5.

As this material progresses rightwardly in FIGURE 2 with the slow rotation of the trough 12, the raw material tends to slide into and cover the lower ends 14 of the electrodes 16 in such a manner that the arcs 17 of the electrodes melt the raw material and form the molten pool 20 in spaced relation to the bottom and side walls of the trough 12.

The slow relative motion between the raw material formation 11 and the electrodes 16, caused by the slow rotation of trough 12 and stationary condition of the electrodes 16, causes a portion 21 of the pool 20 slowly and continuously to be removed from the pool 20. This continuously forms the cylindraceous fused core 22 and the adhering outer crust 24 of partially sintered raw material which slowly travels, rightwardly in FIGURE 2, with the slowly moving trough 12 toward the removing zone 35. This solidified material is of substantial width and height, being always wider than about 3" and higher than about 3".

A large body of raw material is maintained in the trough 12 so that the high temperature molten pool 20 of magnesia or the like, is completely insulated by thick body portions 26, 28, 30, and, in many cases, 32 which completely insulate the trough 12 and its surroundings from the damaging effects of such molten raw material. These bodies 26, 28, 30, and 32 also insulate the trough 12 from the high temperature solidified fused core 22 and from the crust product 24. The raw material is maintained in some instances, at such a height adjacent the electrodes 16 that a layer 32 continuously spills over the lower ends 14 of the electrodes and over the removed portion 21 and the cylindraceous bodies 22 and 24 in a manner completely to cover the product and to cause the product to cool gradually and uniformly. A reflector 37 may be placed adjacent the electrodes to reflect any radiation adjacent the arc zone back into the material.

Additional raw material, 33, and/or removed and crushed crust 24 material, may be introduced, if desired, at chute or funnel 34 to compensate or make up for the shrinkage of volume of the material which is caused by the melting action, so a sufficiently high insulating formation is maintained over the core 22 and crust 24 in the trough 12.

The high temperature energy of the products 22 and 24 is gradually absorbed by the unmelted material 26, 28, 30, 32, and 33 in the form of lower temperature heat energy which travels along with the trough 12 for re-use at the melting zone adjacent the lower ends 14 of the electrodes 16. This lower temperature energy is not harmful to the trough 12, and does not radiate wastefully, yet it reduces the heat load required to melt material to maintain the pool 20. The unmelted product 26, 28, 32, and 33 may be re-circulated without the expense and labor of removing and reintroduction into the melting zone. At least 50% of the unmelted products are re-cycled.

The cylindraceous product 22 and 24 may be lifted out of the trough 12 by any suitable means, such as an elevating platform 36 which extends into the trough with its end at 38. Its action is to break the long cylindraceous body 22, 24 into short cylindraceous bodies 40 which may be removed from the apparatus. These smaller bodies 40 may have their crust material 26 broken away from the core material 24 in any desired manner, not shown, such as by scraping, tumbling, screening, etc. The removed crust material 24 may be crushed to suitable size, if necessary, as elsewhere specified, and may be reintroduced with or without a portion of the raw material either at chutes 10, 34, or elsewhere.

A desirable saving of electrical energy may advantageously be gained because of the re-circulation of the partially heated material which remains in the trough and which is not lifted out of the trough by the removing means 36. Additionally, a saving in labor is accomplished, since this re-circulated material need not be lifted out and conveyed elsewhere for re-use and the like.

Any means for rotating and supporting the trough 12 may be provided. For example, the trough 12 may be made of any suitable metal, such as steel if desired, and may be supported on radial I-beams 42, which are connected to a vertical shaft 44, as by welding, or the like. The shaft 44 may be rotated by any suitable means to produce the desired rate of rotation. For example, the shaft 44 may be rotated by the attached gear or the like 46, spur gear 48, and reduction belt and gear constructions 50, 52, 54, and electric motor 56. These various gear reduction members will be readily recognized by those skilled in the art. Any type of speed reduction for the purpose of changing the relatively high motor speed to the very slow speed of the trough may be used.

The I-beams 42 may be secured to guy members or I-beams 58 which are also connected to the shaft 44 at their upper ends.

The shaft 44 may be supported on any suitable bearing construction which may be supported on a strong base in an insulating enclosure to prevent damage to the bearing construction and drive means, as will be obvious to anyone skilled in the art.

In the embodiment shown in these drawings there may be three electrodes 16, each with its electrode mantle 60. The electrodes 16 may be made of carbon or graphite and each may have an outer diameter of 4" and a cylindrical hole of ¾". Three-phase current may be used, and each phase may be applied to a respective electrode, or pair of electrodes, in a well known manner.

The electrode construction may be of any well known type.

The electrodes may be fed downwardly, as consumed, by the motor and chain drive means 62 which may be automatically or manually controlled to maintain the proper arc level and current in the trough 12, as required.

If desired, two electrodes for each of the three phases, may be used instead of the single electrode for each of the three phases which is illustrated. Pairs of electrodes 16A, 16B, and 16C may be provided, FIGURE 9, respectively, for each of three phases. The arcs are produced mainly between the ends of each pair of electrodes and partly between the different phases at the ends of the electrodes through the pool 20A which is produced at the lower ends of these electrodes. Portion 21A of melted material is withdrawn from one part of pool 20A and is solidified at 22A by the slow rightward movement of formation 11A of raw material. Portions 19A of unmelted material may be introduced at another part of the pool 20A.

With the larger unit, the current used may be 7700 a. per phase, when two electrodes per phase are used, when relatively pure magnesium oxide is used at 100 volts at a power factor of 0.9. With mullite, and with one electrode per phase of three phases the current may be from 2900 to 3500 a. per phase at 100 volts with a power factor of 1.0. The power consumption may be 1200 kw. in the case of relatively pure magnesium oxide and 500 to 600 in the case of mullite.

The larger unit may produce at 40" per hour a fused core of 14" in diameter with a total core and crust of 17" in diameter, when relatively pure magnesium oxide is used. At 50" per hour, a fused core of 18" and total core of 18.5" is produced with mullite. The magnesium oxide is produced at about 1000 pounds per hour. The mullite is produced at about 750 pounds per hour.

The smaller apparatus may have solid carbon or graphite electrodes 1¼" in diameter of single phase with two electrodes per phase. A fused core of 3" in diameter and a total core of 4" is produced by the smaller unit.

Similarly, zirconium boride can be made continuously by using a mixture of zircon, carbon, and boric oxide as the raw material, reacting in the fusion or reaction zone, cool and remove.

The electric arcs in this method are produced between the lower ends of the electrodes which extend below the level of the added raw material. The arcs may be produced mainly between the electrodes of each individual phase and partly between electrodes of different phases when two electrodes per phase are used. With multiple phases, arcs may be produced between electrodes of different phases when only one electrode per phase is used. The arcs are maintained in the central zone.

The formation of the arcs between the ends of the electrodes permits the formation of the melted body, pool or globule 20 in the central zone of the formation 11 without causing the melted material to flow down to the bottom of the trough 12.

A new and useful method is thus provided.

While the form of the invention now preferred has been disclosed as required by statute, other forms may be used, all coming within the scope of the claimed subject matter which follows.

What is claimed is:

1. The method of fusing material selected from the group consisting of magnesia, forsterite, chrome-magnesia, zirconia, and zirconium boride, containing material in discrete form which comprises forming a relatively large linear and annular formation of such material, and slowly and horizontally moving a relatively large annular formation of such material; electrically melting a relatively small, confined, body of such material within a central stationary melting zone in a cross section of such annular formation; continuously advancing the melted zone to separate and cool the melt and thereby solidy a portion of melted material from said confined melted body by the slow relative motion between said linear and annular formation and said melting zone to form a relatively long cylindraceous core having an outer adhering crust of such material; breaking such cylindraceous core and adhering crust into smaller bodies by moving the material up an inclined surface as the core rotates; removing said smaller bodies from such annular formation as it passes a removing zone having slow, relative motion between said linear and annular formation and said removing zone; in which removing zone a part of said adhering crust is removed from said smaller bodies and is returned to said annular formation; and feeding a replacing quantity of such material into such annular formation to compensate for the removal of said smaller bodies from such annular formation.

2. A method according to claim 1 in which the melting means consists of a heating means having electric arc heating capacity located in a central zone of said formation to melt a relatively small, confined, melted body of such material at said central zone; and continuously moving and solidifying a portion of melted material from said confined melted body by said slow relative movement to form a centrally located quantity of fused material in said central zone of said formation.

3. A method according to claim 1 in which said linear unmelted formation is in the form of a relatively thick and deep horizontal orbital formation which continuously and orbitally circulates portions of said unmelted material past said arc zone and said removing zone, and in which additional make up unmelted material is introduced into said formation.

References Cited

UNITED STATES PATENTS

| | | | |
|---|---|---|---|
| 2,091,569 | 8/1937 | Lidgway | 25—156 |
| 3,245,761 | 4/1966 | Trott | 23—304 |

FOREIGN PATENTS

| | | |
|---|---|---|
| 2,416,644 | 8/1946 | Switzerland. |
| 481,869 | 1953 | Italy. |
| 902,129 | 1945 | France. |

NORMAN YUDKOFF, *Primary Examiner.*

G. P. HINES, *Assistant Examiner.*